May 5, 1970     D. W. MURRAY ET AL     3,510,285

FUSING GLASS SHEETS BY ELECTRIC HEAT

Filed April 11, 1967

INVENTORS
*DONALD W. MURRAY* and
*ROBERT W. WHEELER*

BY

*Chisholm and Spencer*

ATTORNEYS

United States Patent Office 3,510,285
Patented May 5, 1970

3,510,285
FUSING GLASS SHEETS BY ELECTRIC HEAT
Donald Wayne Murray, Cheswick, Pa., and Robert W. Wheeler, Lincoln, Ill., assignors to PPG Industries, Inc., a corporation of Pennsylvania
Filed Apr. 11, 1967, Ser. No. 630,047
Int. Cl. C03b 25/00, 29/00; H05b 3/00
U.S. Cl. 65—40                                              5 Claims

ABSTRACT OF THE DISCLOSURE

Electrically working glass to fuse the marginal edge portion of one glass sheet to that of another glass sheet to form a double glazed unit by heating the sheets to a temperature near the strain point of the glass and intensifying the heating in the marginal edge portion of the one sheet to make its marginal edge portion more electroconductive than the remainder of the sheet. A novel circuit applies voltage from an alternating current voltage source alternately to alternate pairs of opposite side edges of the glass sheet margin while alternately excluding current flow from the remaining side edges until the marginal edge portion is substantially uniformly heated to welding temperature.

---

Figure 1:
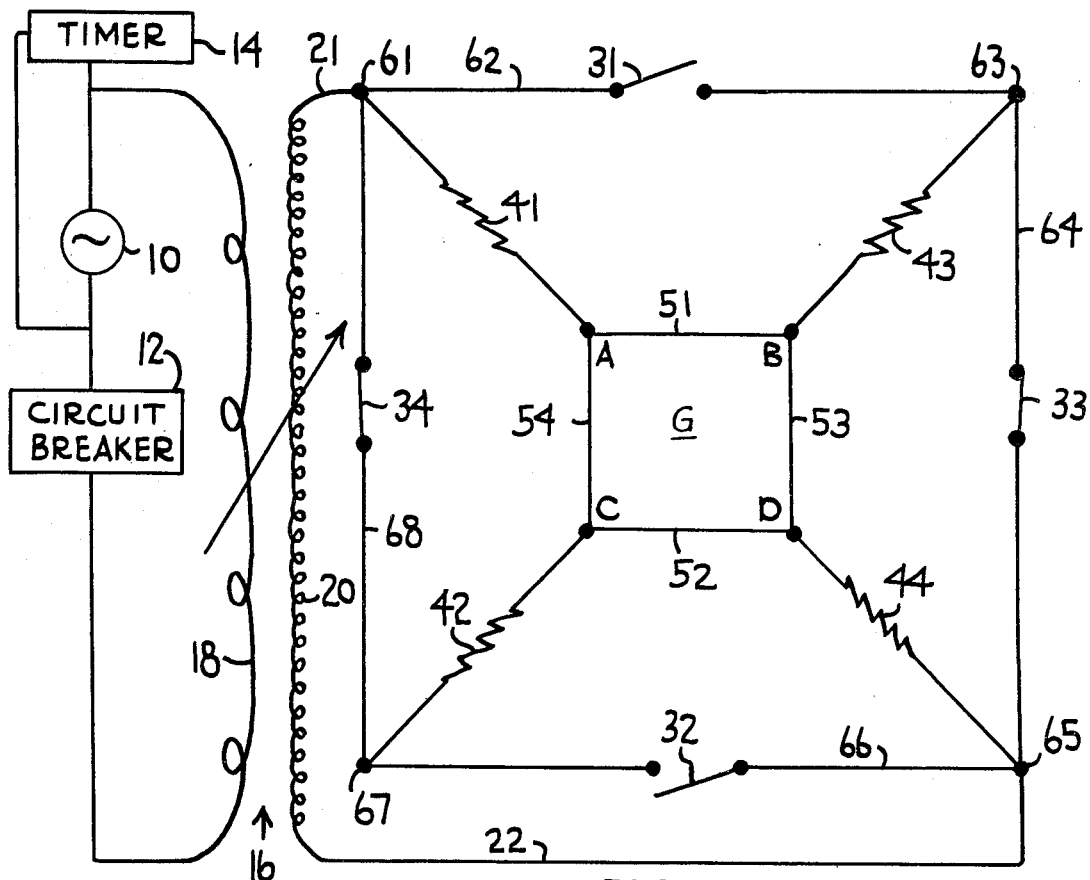

This application refers to electric glass working, and particularly refers to a novel method of heating the marginal edge portion of a glass sheet electrically in order to weld it to another glass sheet to fuse two sheets together along their marginal edge portions while keeping the area within their marginal edge portions in spaced relation to one another to form a multiple glazing unit. A novel electric circuit for heating the marginal edge portion more efficiently than the prior art is important to achieve the object of the present invention.

U.S. Pat. No. 2,398,360 to Edwin M. Guyer et al. discloses a method of manufacturing a double glazed window using an electroconductive stripe around the margin of each of a pair of glass sheets to be welded together along their edges. Current applied between a plurality of electrodes, preferably placed at the corners of a square shaped unit, passes through the stripe to heat the glass sheet margin to a temperature at which the heated glass margin becomes electroconductive and the stripe burns off. The current is either supplied to all four sides of the stripe simultaneously or in a step by step fashion by switching the current from one pair of electrodes to another so as to apply voltage to each of the four sides of the marginal stripe in sequence and repeating this technique of sequential cycles until the glass is completely softened around its margin and susceptible to welding to the other glass sheet. U.S. Pat. No. 2,394,051 to Guyer et al. discloses a particular electrical circuit with stepping switches to control the sequential heating of each of the four sides of a suit to be welded using the step by step cycling method.

It is admitted in the aforesaid patents that when simultaneous heating methods are employed, it is sometimes necessary to shift the electrodes or to provide especially designed control circuits to obtain a proper current distribution. When electrodes are shifted from the corners of the unit to improve current distribution, the glass portion in closest adjacency to the electrode either bows outward or develops a hole facing the electrode. An arc that forms between each electrode and the glass is more easily directed along the length of the marginal edge portions radiating from the adjacent corner than from other points along the sides of the glass sheet being heated for welding.

In addition, when electrodes are spaced from the corners, current flow around the marginal edge portion of the glass seeks a diagonally extending short cut bypassing any corner not directly facing an electrode. This shortening of the current path tends to round out the region of welding inward of the corner of the welded unit, leaving a protrusion at each corner of the double glazed unit that is separated from an electrode during its electrical welding. Consequently, when the electrodes are moved away from the corners of the sheet to adjust the current distribution, the quality of the resulting units leaves something to be desired.

The specially designed circuits preferred in the aforesaid Guyer et al. patents scan the margin of the sheet in step by step fashion by switching the current from between one pair of electrodes to another so as to cause flow between two adjacent electrodes in sequential manner for about seven cycles. Current is increased from cycle to cycle to increase the glass edge temperature in increments along each side edge in sequence until the unit is completely welded.

Control circuits of this type that have been suggested previously have drawbacks also. They require a complicated logic circuit that interrupts current flow whenever the current is switched from one side of the marginal edge portion to the next adjacent side. After switching is completed, the arc between the electrodes and the next side to be heated must be reestablished before current flows in the next side to be heated electrically. Therefore, the prior art circuits that promote step by step heating have a built-in time delay that slows the rate of production.

The special circuits disclosed in the prior art to provide simultaneous current flow to all four sides accentuate the difference in heating rates along the different edges of the glass as the current flow continues. This is because any variation that causes the electrical resistance along any one marginal side edge to differ materially from that of the remaining marginal side edges causes a greater current flow in a circuit through any relatively low resistance marginal side edge and a lesser current flow in the parallel circuits including the other marginal side edges having relatively high resistance. Since heat received is a function of the square of the current flow, the marginal side edge receiving the higher current flow becomes hotter and more electroconductive than the other edges. This unequal heating causes the imbalance in electroconductivity among the edges to accentuate at a geometric rate as current flow continues. This results in one or more edges of the unit of relatively low initial resistance softening before the remaining edges are heated sufficiently for proper fusion.

The present invention has reduced the tendency of unequal edge heating to accentuate during the marginal edge heating incidental to welding. The present invention suggests applying the secondary current of a transformer used in a marginal edge heating circuit so as to permit it to flow alternately through one portion of the marginal edge portion of the glass sheet to be heated to welding temperature without any substantial current in the remainder of the marginal edge portion and to permit the secondary current to flow through the remainder of the marginal edge portion of the glass sheet without any substantial current in the first portion of the marginal edge portion.

In units having four side edges, this is accomplished by using a two way switching circuit in a glass margin heating circuit. The switching circuit permits current to flow alternately through one pair of opposite edges of the glass sheet with no substantial current flow in the remainder of the marginal edge when the switching circuit is gated in one direction and through the other pair of opposite edges only with no substantial current in said one pair of opposite edges when the switching circuit is gated in an opposite direction.

The present invention also provides electric resistance elements having sufficiently high resistance compared to that of the stripe of electroconductive material that is initially placed along the marginal edge portion of the glass sheet to control the rate of current flow between adjacent electrodes, first through the electroconductive material that readily dissipates completely after the glass is heated to a temperature sufficient to become electroconductive, and then through the electroconductive marginal edge portion of the glass sheet.

In an illustrative embodiment of the invention, an input voltage to a step-up transformer is amplified and the output in the secondary transformer circuit alternately passes through one or more circuits controlled by a switching circuit that closes one pair of switches in lines supplying current to one part of the marginal edge portion while another pair of switches in lines supplying current to the remainder of the marginal edge portion are held open to provide open circuits that prevent current flow through the remainder of the marginal edge portion. When the switching circuit is reversed, the first pair of switches is opened to provide open circuits that prevent current flow in the one part of the marginal edge while the other pair of switches is now closed to supply current through the remainder of the marginal edge portion. In an illustrative embodiment of this invention, the first pair of switches controls current flow to one pair of alternate side edges and the second pair of switches controls current flow to the other pair of alternate side edges.

A detailed description of a typical example of a circuit for performing the present invention will be described in order to facilitate understanding of the present invention.

Figure 2:
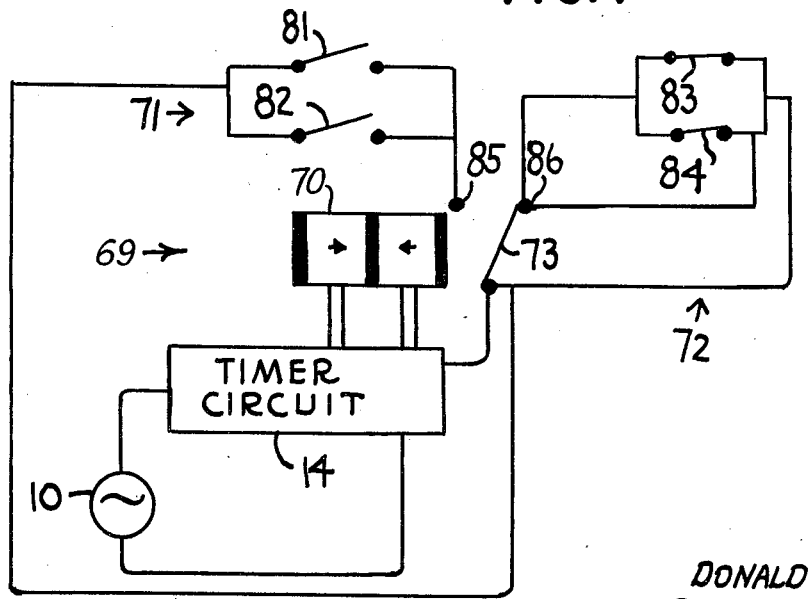

In the drawings, which form part of the description:

FIG. 1 is a schematic diagram of an electric circuit used to heat the marginal edge portion of a glass sheet for marginal edge welding according to the present invention, and FIG. 2 is a detailed schematic diagram of an electric circuit for controlling the alternate operation of different pairs of switches controlling alternate current flow to alternate pairs of glass sheet edge portions during an electric welding operation.

In accordance with the technique of the prior art, a larger glass sheet G is aligned over a smaller glass sheet in closely spaced relation thereto and both sheets heated to an elevated temperature in the vicinity of the strain point of glass. The marginal portion of sheet G, having a readily dissipated electroconductive stripe thereon, is intensely heated by passing a high voltage potential through electrodes A, B, C, and D disposed in the vicinity of the corners of the larger glass sheet G that is to be welded to the smaller sheet. The readily dissipated conductive stripe is applied to the upper surface along the entire margin of the glass sheet so that the conductive stripe initially provides a highly conductive path about the marginal portion of the glass sheet G as in the prior art.

The novel circiut of the present invention produces alternate heating of different sets of opposite sides of the four sides of the glass sheet marginal portion by utilizing one position of the switching circuit to pass current through one part only of the marginal glass edge portion and the other position of the switching circuit to pass current through the remainder only of the marginal glass edge portion as will be understood more clearly from a description that follows.

In the drawings which form part of the description, a source of alternating current voltage 10 is connected through a circuit breaker 12 to a timer circuit 14 and also to a step-up transformer 16.

The primary coils 18 of transformer 16 are coupled to the alternating current voltage source 10. The secondary coils 20 of the transformer 16 impart an output voltage through lines 21 and 22. The output of the transformer 16 provides high voltage for alternately heating opposite pairs of marginal edge portions through electrodes A, B, C and D in a manner to be described in detail.

The four electrodes A, B, C and D are disposed in sufficient proximity to the corners of the glass sheet G to produce a spark or arc across the short gap to enable current to flow between said electrodes and the electroconductive stripe applied about the marginal perimeter of the glass sheet G. Each of the electrodes A, B, C and D should be equally spaced from an adjacent corner of the glass sheet. In order to establish an arc quickly at each corner, there should be a small air gap between each electrode and its adjacent corner of the glass sheet. A preferable disposition is to have each electrode pointed diagonally inward toward the adjacent corner and spaced from between about 1/8 inch and 3/16 inch from the adjacent corner.

The circuit for controlling the alternate flow of current along the opposite pairs of marginal edges of the glass sheet comprises four switches 31, 32, 33 and 34. The switches are arranged so that switches 31 and 32 are simultaneously in the conducting position when switches 33 and 34 are in the open position and the latter pair is in the conducting position when the former pair is in the open position with the alternating of the conductive and nonconductive positions depending upon the setting in a switching circuit 70 (FIG. 2) which places either pair of switches in a conducting position and simultaneously places the other pair of switches in an open position.

The control circuit comprises a plurality of resistors 41, 42, 43 and 44 connected to electrodes A, C, B and D, respectively, in the manner disclosed in the drawing. The four sides of the marginal edge portion of the glass sheet are depicted by reference numbers 51, 52, 53 and 54.

Line 21 connects one secondary terminal of the transformer 16 to a connection 61, which connects to electrode A through resistor 41. A line 62 containing switch 31 connects connection 61 to connection 63. The latter connects to electrode B through resistor 43 and to a line 64 which includes switch 33. Line 64 extends to a connection 65 which is connected to electrode D through resistor 44.

An additional line 66 containing switch 32 extends from connection 65 to an additional connection 67. The latter in turn is connected to electrode C through resistor 42 and also is connected to another line 68 which contains switch 34 and is connected to connection 61. Line 22 connects connection 65 with the terminal of the secondary 20 of the transformer 16 opposite the terminal to which line 21 is connected.

The switching circuit 69 is coupled to the timer circuit 14 and comprises a two way acting relay 70 and two switch circuits 71 and 72. Relay 70 comprises a movable contacting element 73, whose position is reversed as frequently as desired by presetting timer circuit 14 accordingly. One of the switch circuits 71 comprises solenoid switches 81 and 82 arranged in parallel and ganged to operate switches 31 and 32 simultaneously in either the open position as in FIG. 1 or in a conducting condition. The other switch circuit 72 comprises solenoid switches 83 and 84 arranged in parallel and ganged to operate switches 33 and 34 in either the conducting condition as in FIG. 1 or in an open position. It is necessary that the switches controlled by circuit 71 be in an opposite condition from those controlled by circuit 72.

The movable contacting element 73 moves between a pair of contacts 85 and 86. When relay 70 is actuated by timer circuit 14 to move the contacting element into contact with contact 85, solenoid switches 81 and 82 in switching circuit 71 are actuated to cause switches 31 and 32 to move into a conducting condition. At the same time, lack of contact of the contacting element 73 with contact 86 causes the solenoid switches 83 and 84 in switching circuit 72 to deactivate, enabling switches 33 and 34 to assume a normally open position. When contacting element 73 of relay 70 is moved to engage contact 86, as in FIG. 2, solenoid switches 83 and 84 in switching circuit 72 are activated to move switches 33 and 34 into the conducting condition and solenoid switches 81 and 82 in switching circuit 71 are deactivated to enable switches 31 and 32 to resume the open position, as shown in FIG. 1.

Switch 31 in line 62, when closed, permits current flow between connection 61 and connection 63. Switch 32 in line 66, when closed, permits current flow between connection 67 and connection 65. Switch 33 permits current flow in line 64 between connection 65 and connection 63, when closed, and switch 34, when closed, permits current flow in line 68 between connection 67 and connection 61. Each line containing a switch is in parallel with a line comprising two of the aforesaid resistors and a side of the glass sheet or its electroconductive stripe in series. The position of the switching circuit 69 as controlled by the timer circuit 14 determines whether current reaching connections 61 and 65 is transmitted through sides 51 and 52 and bypasses sides 53 and 54 through lines 64 and 68 or is transmitted through sides 53 and 54 and bypasses sides 51 and 52 through lines 62 and 66, as will be explained later.

When the margin of a glass sheet G is subjected to voltage so that its marginal sides 51, 52, 53, and 54 are heated to welding temperature, an alternating voltage such as shown in FIG. 2 is supplied by an A.C. source 10. The voltage is applied across the primary coils 18 of transformer 16. The high voltage output of the secondary 20 is alternately applied through sides 51 and 52 when switches 33 and 34 are conducting and switches 31 and 32 are open, and through sides 53 and 54 when switches 31 and 32 are conducting and switches 33 and 34 are open.

When switches 31 and 32 are conducting and switches 33 and 34 are open, current flows to connection 61, through line 62 containing conducting switch 31, to connection 63, through resistor 43, to electrode B, through the electroconductive material along the side 53 of the marginal edge portion of the glass sheet G, through electrode D, through resistor 44 to connection 65 and to line 22 to the secondary. At the same time, an alternate path of current flows through resistor 41, electrode A, the electroconductive material along side 54, electrode C, resistor 42, to connection 67, through line 66 containing conducting switch 32, to connection 65, and through line 22 to the transformer secondary.

Open switch 33 in line 64 and open switch 34 in line 68 inhibit flow in these latter lines when these latter switches 33 and 34 are open. Therefore, when the switches are arranged as described above, current bypasses open circuits 64 and 68 and flows through sides 53 and 54, originally through the stripe of graphite and subsequently through the marginal portion of the glass when the latter has become sufficiently hot to become electroconductive.

At this part of the cycle controlled by switching circuit 69, no substantial current flows through sides 51 or 52, because electrodes A and B are at substantially equal potential to one another, because the potential drop across resistor 41 to electrode A is substantially equal to the potential drop across closed switch 31 and resistor 43 to electrode B, and electrodes C and D are at substantially equal potential to one another because the additional voltage drop across side 54 substantially equals that across side 53. Therefore, the difference in potential between electrode A and electrode C is substantially equal to the difference in potential between electrodes B and D. All the resistors 41, 42, 43 and 44 are of substantially equal value.

In the other part of the cycle when switches 31 and 32 are open and switches 33 and 34 are conducting, current flows from line 22, through connection 65, through resistor 44, through electrode D, through side 52, through electrode C, through resistor 42, to connection 67, to line 68 containing conducting switch 34, to connection 61, to line 21 back to the secondary 20. Simultaneously, the current takes an alternate path of flow through line 22, to connection 65, through line 64 connecting conducting switch 33, to connection 63, through resistor 43, to electrode B, along side 51 to electrode A, through resistor 41, to connection 61, to line 21, to the secondary 20 of the transformer 16. At this part of the operating cycle, the substantially infinite resistance of open switches 31 and 32 to a flow of current in the lines 62 and 66 causes the current to flow between electrodes B and A along side 51 and between electrodes D and C along side 52 in parallel paths. Electrodes B and D now are at substantially the same potential, and electrodes A and C at substantially the same potential as one another, differing from that of electrodes B and D so as to avoid any substantial cross current in the direction in which current flow took place when switches 31 and 32 were conducting and switches 33 and 34 were open.

A typical operation to produce a square sheet of ⅛ inch thick sheet glass having a length 12 inches on edge used resistances of 1250 ohms and initially applied a readily dissipated electroconductive coating having a resistance of about 1400 ohms per inch of length. The alternating current was provided through a step-up transformer at an output voltage that was gradually increased to 12,500 volts. The resistance along the glass edge at the end of the heating cycle was 50 ohms per linear inch.

During the electrical heating operation, the two sheets were aligned with the upper sheet ¼ inch larger along each dimension to provide a ⅛ inch wide overhang. As this margin softened, a vacuum platen supporting the upper sheet lifted the upper sheet slightly to enable the margin of the upper sheet to droop and weld to the margin of the lower sheet.

The time of welding was compared to that of a commercial operation using the sequential welding technique depicted in the Guyer et al. patents recited hereinabove for heating one side edge at a time. Approximately 10 percent less time was required for marginal heating and welding utilizing the circuit described herein to heat two opposite sides in pairs alternately than by using the sequential heating operation (step by step method) depicted in the previous patents.

The use of simultaneous flow through the opposed, spaced sides of the marginal edge portion to weld the glass sheet marginal edge portions together was difficult to obtain uniformly using the sequential method or the simultaneous method suggested by the Guyer et al. patents. Once one of the sides heated more rapidly than the other sides, it became more electroconductive and caused the heated side to increase its rate of heating with an accelerating difference in heating rates, because the glass electroconductivity increases rapidly with increasing glass temperature. Alternating the flow of current in opposite spaced pairs of marginal edge portions reduced this effect. Heating about the marginal edge was more uniform from side to side using the presently suggested technique.

The ballast resistances in the present circuit minimize the tendency of a more electroconductive side to accelerate its rate of heating at a more rapid rate than the remaining sides as the current continues to flow in the marginal edge portion of the glass sheet to be welded. This benefit adds to the improvement in minimizing unequal edge heating that results from the alternate heating presently proposed as compared to the simultaneous heating of the prior art. Thus, the alternate current application to opposed sides in pairs proposed by the present invention provides faster welding than the prior art step by step method of heating each side in sequence while minimizing the accelerated heating of one side compared to the remaining sides found in simultaneous heating of all four sides using parallel electrical paths.

The reason for the accelerated rate of edge heating and welding compared to the prior art step by step operation is believed to be due primarily to the reduction in the number of switching steps required for seven complete heating cycles to complete the operation. Each switching step caused a relatively large time gap in the current flow and a need to reestablish an arc every time current flow was reestablished in the step by step system of the prior art. Seven complete cycles required 28 time gaps for changing the load in the heating circuit using the Guyer et al. step by step method and only 14 time gaps to change the load in the heating circuit using the present technique.

The circuit described hereinabove has been most successful in welding the marginal portions of square glass sheets to one another to produce double glazed units. Also, some rectangular units have been produced. In producing rectangular units, the time circuit 14 was used to change the output voltage of the variable output transformer each time the voltage applied was changed from the relatively long pair of opposite sides to the relatively short pair of opposite sides. A higher output voltage was applied across the opposite pair of longer sides than across the opposite pair of shorter sides. The electrodes were directed diagonally toward the corners to produce the required spark gaps at the beginning of the operation.

What is claimed is:

1. In a method of heating the marginal edge portion constituting the entire periphery of a sheet of glass to a temperature sufficient to fuse its marginal edge portion to the marginal edge portion of another glass sheet by heating said sheet to a temperature near the strain point of the glass, intensifying the heating in said marginal edge portion of said sheet to make said marginal edge portion more electroconductive than the remainder of the sheet and passing current through said marginal edge portion until the sides comprising said marginal edge portion reach a temperature desired for fusion substantially simultaneously, the improvement comprising coupling an alternating current voltage source to said marginal edge portion to produce an output current in such a manner that substantially all the output current produced in response to said voltage passes alternately through one part of said marginal edge portion with substantially no current flow through the remainder of said marginal edge portion, and through the remainder of said marginal edge portion, with substantially no current flow through said one part of said marginal edge portion.

2. In a method as in claim 1, for use in heating the marginal edge of a four sided glass sheet having four sides disposed about the periphery thereof, wherein said alternating current voltage source is alternately coupled to pass the output current alternately through one pair of spaced side edge portions of said four sides while preventing substantial current flow in said other pair of spaced side edge portions, and through the other pair of spaced side edge portions of said sheet while preventing substantial current flow in said one pair of spaced side edge portions.

3. In the method as in claim 2, for use in heating the marginal edge of a four sided glass sheet of rectangular outline having a relatively long pair of opposite sides and a relatively short pair of opposite sides, wherein a higher voltage is simultaneously applied across said relatively long pair of opposite sides when current is passed through said relatively long pair of opposite sides, and alternately, a lower voltage is simultaneously applied across said relatively short pair of opposite sides when current is passed through said relatively short pair of opposite sides.

4. The improvement according to claim 2, wherein said marginal edge portion is intensively heated by applying a stripe of a readily dissipated electroconductive material having a lower electrical resistance than the glass at an initial glass temperature along the length of said marginal edge portion and coupling said alternating current voltage source to said stripe by passing the output current through opposite pairs of sides of said stripe alternately in said manner, whereby said marginal portion heats to a temperature at which it becomes electroconductive before said electroconductive material dissipates completely and continuing to couple said alternating current voltage source to said electroconductive marginal edge portion by passing the output current through opposite pairs of sides of said marginal edge portion of said glass sheet alternately in said manner after said electroconductive material dissipates until said marginal portion attains a temperature desired for welding.

5. The improvement according to claim 4, further including passing said output current through electrical resistance elements having sufficiently high resistance compared to that of said stripe of electroconductive material in series with alternate pairs of opposite sides of said stripe and of said marginal edge portion to effectively limit any variation in current flow between adjacent electrodes first through different sides of said stripe of said electroconductive material and then through different sides of said electroconductive marginal edge portion of the glass sheet.

References Cited

UNITED STATES PATENTS 2,394,051  2/1946  Guyer et al. _____ 219—503

OTHER REFERENCES

La Pierre, Intro. to Electrical Engineering, 1956, pp. 214–215.

S. LEON BASHORE, Primary Examiner

S. R. FRIEDMAN, Assistant Examiner

U.S. Cl. X.R.

65—58; 219—85, 482, 508